United States Patent [19]

Billault

[11] 4,051,037
[45] Sept. 27, 1977

[54] DEVICE FOR ASSEMBLING STACKED ANNULAR FILTERING ELEMENTS, UNDER CONSTANT PRESSURE

[75] Inventor: Michel Billault, Limoges, France

[73] Assignee: Sofrance S.A., Limoges, France

[21] Appl. No.: 730,177

[22] Filed: Oct. 7, 1976

[30] Foreign Application Priority Data

Oct. 16, 1975 France .................... 75.31678

[51] Int. Cl.² .............................................. B01D 25/04
[52] U.S. Cl. ............................................. 210/236; 210/488; 210/492
[58] Field of Search ...................... 210/236, 488, 492

[56] References Cited

U.S. PATENT DOCUMENTS 3,322,279  5/1967  Kasten ........................ 210/488 X
3,481,480  12/1969 Schinghammer ................. 210/488

FOREIGN PATENT DOCUMENTS 214,774    5/1958  Australia ...................... 210/488
1,151,362  1/1958  France ......................... 210/488

Primary Examiner—Frank A. Spear, Jr.
Assistant Examiner—Richard W. Burks

[57] ABSTRACT

The invention relates to a device for assembling stacked annular filtering elements under constant pressure. The device comprises a support which provides an abutment for one end of the stack of filtering elements, a presser member which provides an abutment for the other end of the stack, and a calibrated spring which biases the presser member towards the support while trapping the stack of elements between the two abutments. The device is useful for the manufacture of filters used particularly for the filtration of oils.

11 Claims, 5 Drawing Figures

U.S. Patent  Sept. 27, 1977  Sheet 1 of 2  4,051,037
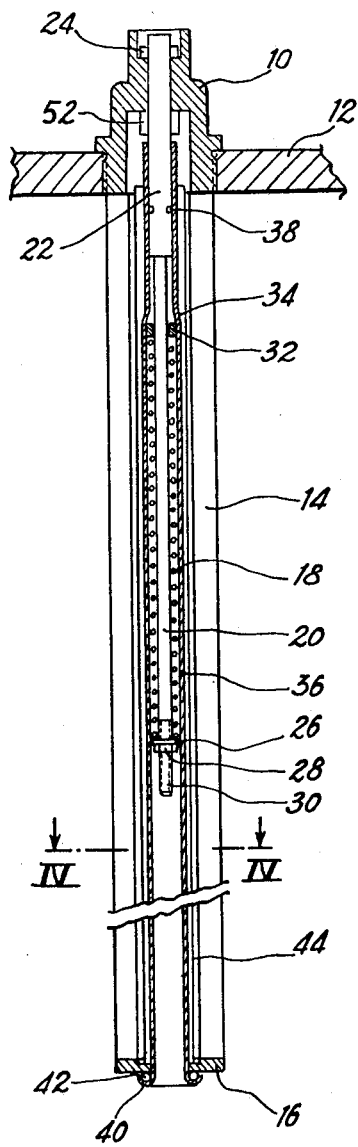
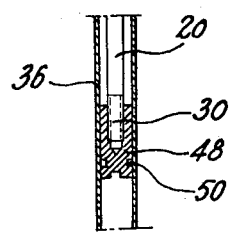
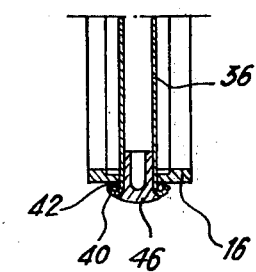
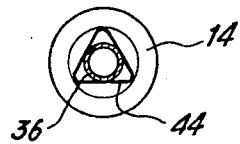

DEVICE FOR ASSEMBLING STACKED ANNULAR FILTERING ELEMENTS, UNDER CONSTANT PRESSURE

The present invention relates to a device for the assembly of stacked annular filtering elements, under constant pressure.

Prior art already exists relating to devices for assembling filtering elements constituted by annular plates made from paper or any other suitable material.

Devices of this type comprise a support providing an abutment for one end of the stack of elements, a presser member providing an abutment for the other end of the stack of elements and a calibrated spring acting to bias the presser member towards the support such that said abutments are pushed one towards the other, trapping the stack of elements therebetween.

Thus, for example, French Pat. No. 1,151,362 describes an assembly device of this type, in which the spring is a spring where the coils are touching and which is in tension and is located downstream of the filter constituted by the filtering elements. This spring may become a source of pollution, in view of the fact that the manufacturing impurities of the spring tend to remain attached between the coils and to be released during tensioning of the spring.

The object of the present invention is to avoid such drawbacks by proposing an assembly device of the aforesaid type, which is characterised by the fact that the spring is located upstream of the filtering elements with respect to the direction of filtration.

According to another feature of the invention, the spring is housed inside a tube whereof one end is connected to the presser member and whereof the other end is mounted to slide in a sealed manner on a securing member connected to the support.

Further features and advantages of the invention will become apparent on reading the ensuing detailed description, relating to two embodiments, given purely as an illustration and in a nonlimiting manner, of an assembly device according to the invention and referring to the accompanying drawings in which:

FIG. 1 is a longitudinal sectional view of a device constructed according to a first embodiment, in which the spring is in compression;

FIG. 2 is a partial longitudinal section of a device constructed according to a variation of the first embodiment;

FIG. 3 shows the lower end of a tube of a device according to the first embodiment, which is equipped with a sealing stopper;

FIG. 4 is a sectional view along the plane IV-IV of FIG. 1 and

In these figures, the same parts are designated by the same reference numerals.

Figure 5:
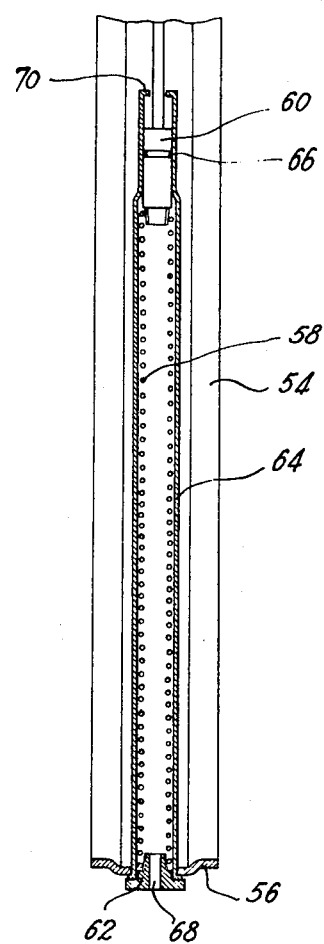
FIG. 5 is a partial longitudinal section of a device constructed according to a second embodiment, in which the spring is in tension.

The device illustrated in FIG. 1 comprises a support 10 screwed or fixed in any other manner to a filter-support plate 12. The support 10 provides an abutment for one end of a stack 14 of filtering elements each constituted by an annular plate made from paper or any other suitable material.

The device also comprises a presser member 16 in the shape of a cup which provides an abutment for the other end of the stack 14 and which is biased towards the support 10 by means of a calibrated spring 18 such that the two abutments are pushed one towards the other thus trapping the stack 14 of filtering elements therebetween.

The spring 18 is threaded on a rod 20 which is connected to the support 10 by means of a securing member 22 which is retained on the support by means of a cotter pin 24. The rod 20 may be made in one piece with the member 22 or may be secured to the latter by screwing or any other suitable securing method. The spring 18 bears firstly on a retaining member located at the free end of the rod 20 and constituted by a washer 26 retained by a nut 28 screwed to a screw-threaded part 30 of the rod and secondly on a washer 32. This washer 32 co-operates with the shoulder 34 constituted by a contraction of a hollow tube 36 which constitutes a sealed chamber for the spring 18. The upper end of the tube 36 slides in a sealed manner on the securing member 22, the seal being ensured by an annular gasket 38 located in a groove provided in said member 22. The lower end of the tube 36 is rolled outwards in order to bias the presser member 16 in the direction of the support 10 and to form an annular groove 40 in which a gasket 42 is housed.

The device also comprises a centering member constituted by a bent tube 44 of substantially triangular section which is located in the annular part provided between the tube 36 and the inside of the stack 14, such that each of the three sides of the centering member 44 is in contact with the tube 36 and that each of the three tops of the centering member 44 is in contact with the inside of the stack (c.f. FIG. 4). This centering member may have a different shape and may for example have a square section.

In the variation of FIG. 2, the washer 26 and nut 28 of FIG. 1 have been replaced by a grooved nut 48 provided with a gasket 50 and screwed onto the screw-threaded part 30 of the rod 20, such that the spring 18 is located in a sealed chamber Furthermore, it is possible both in the device of FIG. 1 and in that of FIG. 2, to place a stopper 46 at the lower part of the tube 36 (c.f. FIG. 3). This stopper 46 ensures that the spring of the device of FIG. 1 is placed in a sealed chamber and constitutes an additional precaution in the case of the device of FIG. 2.

The filter constituted by the filtering elements assembled by means of the device of the invention is used in a conventional manner. For this, it is sufficient to immerse the filter in the liquid to be purified and to provide a pressure difference between the inside and outside of the filter by connecting a vacuum pump to the support 10 of the device.

To this end, the support 10 is provided with at least one opening, such as 52, which allows the passage of the purified liquid.

FIG. 5 is a partial section of a device constructed according to a second embodiment.

This device comprises a stack 54 of filtering elements trapped between a support (not shown) indentical to that of FIG. 1 and a presser member 56 in the shape of a cup. The presser member is biased towards the support by means of a spring 58 in tension, whereof one end is connected to the support by means of a securing member 60 and whereof the other end is connected to the presser member by means of a support member 62. The spring 58 is fixed to the securing member 60 and to the support member 62 by being screwed with force onto screw-threaded parts, whereof the pitch is equal to the diameter of the wire from which the spring is made.

The spring 58 is housed in a tube 64, whereof one end slides in a sealed manner on the securing member 60, the latter being provided with a gasket 66 and whereof the other end is mounted on the cup by gripping or any other means. The support member 62 is provided with an orifice 68 to facilitate counterbalancing of the pressure in the tube.

At its upper part, the tube 64 comprises a shoulder 70 in order to prevent the tube from escaping from the securing member in the case of accidental fracture of the spring.

The device illustrated in FIG. 5 may also comprise a centering member as indicated above and it is used in the same way as the device illustrated in FIGS. 1 to 4.

The device of the invention will therefore find an application in the production of filters for various industries and in particular in the chemical industry for the filtration of oils.

Naturally the invention is not limited to the embodiments described and it also extends to variations in accordance with its spirit.

What is claimed is:

1. A device for the assembly of stacked annular filtering elements under constant pressure for filtering a fluid flowing through the stack of elements from the outside thereof to the inside thereof, the device comprising a support which provides an abutment for one end of the stack of elements, a presser member which provides an abutment for the other end of the stack of elements, and a calibrated spring acting to bias the presser member towards the support such that said abutments are pushed one towards the other thus trapping the stack of elements therebetween, said spring being housed inside a tube located inside the stack of elements, one end of the tube being connected to the presser member and the other end of the tube being mounted to slide in a sealed manner on a securing member connected to the support, whereby the spring cannot contact the filtered fluid leaving the inside of the stack of elements.

2. A device according to claim 1, in which the spring is in compression and is threaded on a rod fixed to the securing member, the spring bearing firstly on a retaining member located at the free end of the rod and secondly on a washer co-operating with a shoulder of the tube provided in the vicinity of the end of the tube which slides on the securing member.

3. A device according to claim 2, in which the retaining member is constituted by a washer retained by a nut screwed on a threaded part of the rod.

4. A device according to claim 2, in which the retaining member is constituted by a grooved nut provided with a gasket and screwed onto a screw-threaded part of the rod.

5. A device according to claim 1, comprising a sealing stopper co-operating with the free end of the tube, connected to the presser member.

6. A device according to claim 1, in which the presser member is constituted by a cup and said cup is biased against one end of the tube which is rolled towards the outside in order to form an annular groove.

7. A device according to claim 6, comprising a gasket housed in said groove.

8. A device according to claim 1, in which the spring is in tension and is connected at one of its ends to the securing member and at its other end to the presser member.

9. A device according to claim 8, in which the presser member is constituted by a cup assembled on the tube and the spring biases said cup through the intermediary of a support member on which the spring is screwed with force.

10. A device according to claim 9, in which the support member is provided with an orifice for counterbalancing pressures in the tube.

11. A device according to claim 1, comprising a centering member located in the annular space provided between the tube and the inside of the stack of filtering elements.

* * * * *